United States Patent
Camacho Perez et al.

(10) Patent No.: US 11,516,336 B2
(45) Date of Patent: *Nov. 29, 2022

(54) SURFACE DETECTION FOR MOBILE DEVICES

(71) Applicant: Intel Corporation, Santa Clara, CA (US)

(72) Inventors: Jose Camacho Perez, Guadalajara (MX); Miguel Bernal Marin, Zapopan (MX); Mario Alfredo C. Arevalo, Guadalajara (MX); Hector Cordourier Maruri, Guadalajara (MX); Jesus Adan Cruz Vargas, Zapopan (MX); Abraham Duenas De La Cruz, Tlajomulco (MX); Paulo Lopez Meyer, Zapopan (MX); Julio Zamora Esquivel, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,097

(22) Filed: Feb. 18, 2021

(65) Prior Publication Data

US 2021/0203769 A1    Jul. 1, 2021

Related U.S. Application Data

(63) Continuation of application No. 16/836,379, filed on Mar. 31, 2020, now Pat. No. 10,938,977, which is a
(Continued)

(51) Int. Cl.
*H04M 3/00* (2006.01)
*H04M 1/72448* (2021.01)
(Continued)

(52) U.S. Cl.
CPC ........ *H04M 1/72448* (2021.01); *G01B 17/08* (2013.01); *G06N 3/08* (2013.01); *G06N 20/00* (2019.01); *H04M 19/047* (2013.01)

(58) Field of Classification Search
CPC ............ H04M 1/72448; H04M 19/047; G06N 20/00; G06N 3/08; G01B 17/08
See application file for complete search history.

(56) References Cited

U.S. PATENT DOCUMENTS

| 9,836,931 B1 | 12/2017 | Rivaud et al. |
| 10,609,205 B2 | 3/2020 | Camacho Perez et al. |

(Continued)

FOREIGN PATENT DOCUMENTS

| WO | 2013165627 | 11/2013 |
| WO | 2016171848 | 10/2016 |

OTHER PUBLICATIONS

United States Patent and Trademark Office, "Non-Final Office Action," dated Apr. 26, 2019 in connection with U.S. Appl. No. 16/235,733, 7 pages.

(Continued)

*Primary Examiner* — Erika A Washington
(74) *Attorney, Agent, or Firm* — Hanley, Flight and Zimmerman, LLC

(57) ABSTRACT

A disclosed example includes providing vibration information to a model, the vibration information corresponding to a first vibration measured at a first mobile device when the first mobile device is in a state of non-use by a user, the model based on a plurality of vibration patterns that correspond to second vibrations measured by second mobile devices in different environments; identifying, using the model, one of the vibration patterns that corresponds to the vibration information; determining an environment of the first mobile device based on the one of the vibration patterns;
(Continued)

and instructing the first mobile device to modify a functionality of the first mobile device based on the environment.

20 Claims, 10 Drawing Sheets

Related U.S. Application Data continuation of application No. 16/235,733, filed on Dec. 28, 2018, now Pat. No. 10,609,205.

(51) Int. Cl.
| | |
|---|---|
| *G06N 20/00* | (2019.01) |
| *G01B 17/08* | (2006.01) |
| *H04M 19/04* | (2006.01) |
| *G06N 3/08* | (2006.01) |

(56) References Cited

U.S. PATENT DOCUMENTS

| | | |
|---|---|---|
| 10,938,977 B2 | 3/2021 | Camacho Perez et al. |
| 2014/0260642 A1 | 9/2014 | Goel et al. |
| 2014/0270202 A1 | 9/2014 | Ivanov et al. |
| 2017/0115743 A1 | 4/2017 | Kasar et al. |

OTHER PUBLICATIONS

United States Patent and Trademark Office, "Final Office Action," dated Aug. 8, 2019 in connection with U.S. Appl. No. 16/235,733, 7 pages.

United States Patent and Trademark Office, "Notice of Allowance," dated Nov. 13, 2019 in connection with U.S. Appl. No. 16/235,733, 9 pages.

United States Patent and Trademark Office, "Non-Final Office Action," dated May 18, 2020 in connection with U.S. Appl. No. 16/836,379, 8 pages.

United States Patent and Trademark Office, "Final Office Action," dated Jun. 8, 2020 in connection with U.S. Appl. No. 16/836,379, 7 pages.

United States Patent and Trademark Office, "Notice of Allowance," dated Jun. 25, 2020 in connection with U.S. Appl. No. 16/836,379, 7 pages.

United States Patent and Trademark Office, "Notice of Allowance," dated Oct. 15, 2020 in connection with U.S. Appl. No. 16/836,379, 7 pages.

United States Patent and Trademark Office, "Corrected Notice of Allowability," dated Oct. 29, 2020 n connection with U.S Patent Application No. 16/836,379, 2 pages.

European Patent Office, "Invitation Pursuant to Rule 62a(1) EPC," issued Jun. 5, 2020 in connection with European Application No. 19212320.6, 3 pages.

European Patent Office, "Extended European Search Report," dated Sep. 30, 2020 in connection with European Application No. 19212320.6, 10 pages.

European Patent Office, "Communication Pursuant to Article 94(3) EPC," dated Sep. 23, 2022 in connection with European Patent Application No. 19212320.6, 11 pages.

Darbar et al., "SurfaceSense: Smartphone Can Recognize Where It Is Kept," Proceedings of the 7th International Conference on HCI, Dec. 17-19, 2015, 8 pages.

Cho et al., "Vibration-Based Surface Recognition for Smartphones," 2012 IEEE International Conference on Embedded and Real-Time Computing Systems and Applications, 2012, 6 pages.

Shafer, "Learning Location from Vibration," Feb. 13, 2013, XP055960986, retrieved from the Internet from [http://www.mrcaps.com/proj/LocationVibration/fiies/vibration-ishafer-paper.pdf] on Sep. 14, 2022, 8 pages.

SURFACE DETECTION FOR MOBILE DEVICES

RELATED APPLICATIONS

This application arises from a continuation of U.S. patent application Ser. No. 16/836,379, filed on Mar. 31, 2020, now issued as U.S. Pat. No. 10,938,977, which is a continuation of U.S. patent application Ser. No. 16/235,733, filed on Dec. 28, 2018, now issued as U.S. Pat. No. 10,609,205. U.S. patent application Ser. Nos. 16/836,379 and 16/235,733 are hereby incorporated herein by reference in their entireties. Priority to U.S. patent application Ser. Nos. 16/836,379 and 16/235,733 is hereby claimed.

BACKGROUND

Mobile devices, such as smart phones, can be used for performing a wide variety of functions. For example, phone functions (such as voice calls and text messaging), as well as internet (including web browsing) and multimedia functionalities (including music, video, cameras and gaming), can be performed. Additionally, mobile devices can include various sensors that can be leveraged by software resident on the device or remotely connected, such as a magnetometer, proximity sensors, barometer, gyroscope, thermometer, and accelerometer, and can also support various wireless communication protocols, such as Bluetooth, Wi-Fi and satellite navigation.

Given the extremely wide variety of uses for mobile devices, it can be helpful to provide a user with focused functionality or operation predicted to be particularly relevant in a given environment or context. As such, it can be useful for a mobile device to have a degree of awareness of its immediate surroundings.

BRIEF DESCRIPTION OF THE DRAWINGS

Features and advantages of technology embodiments will be apparent from the detailed description which follows, taken in conjunction with the accompanying drawings, which together illustrate, by way of example, various technology features; and, wherein.

Figure 1:
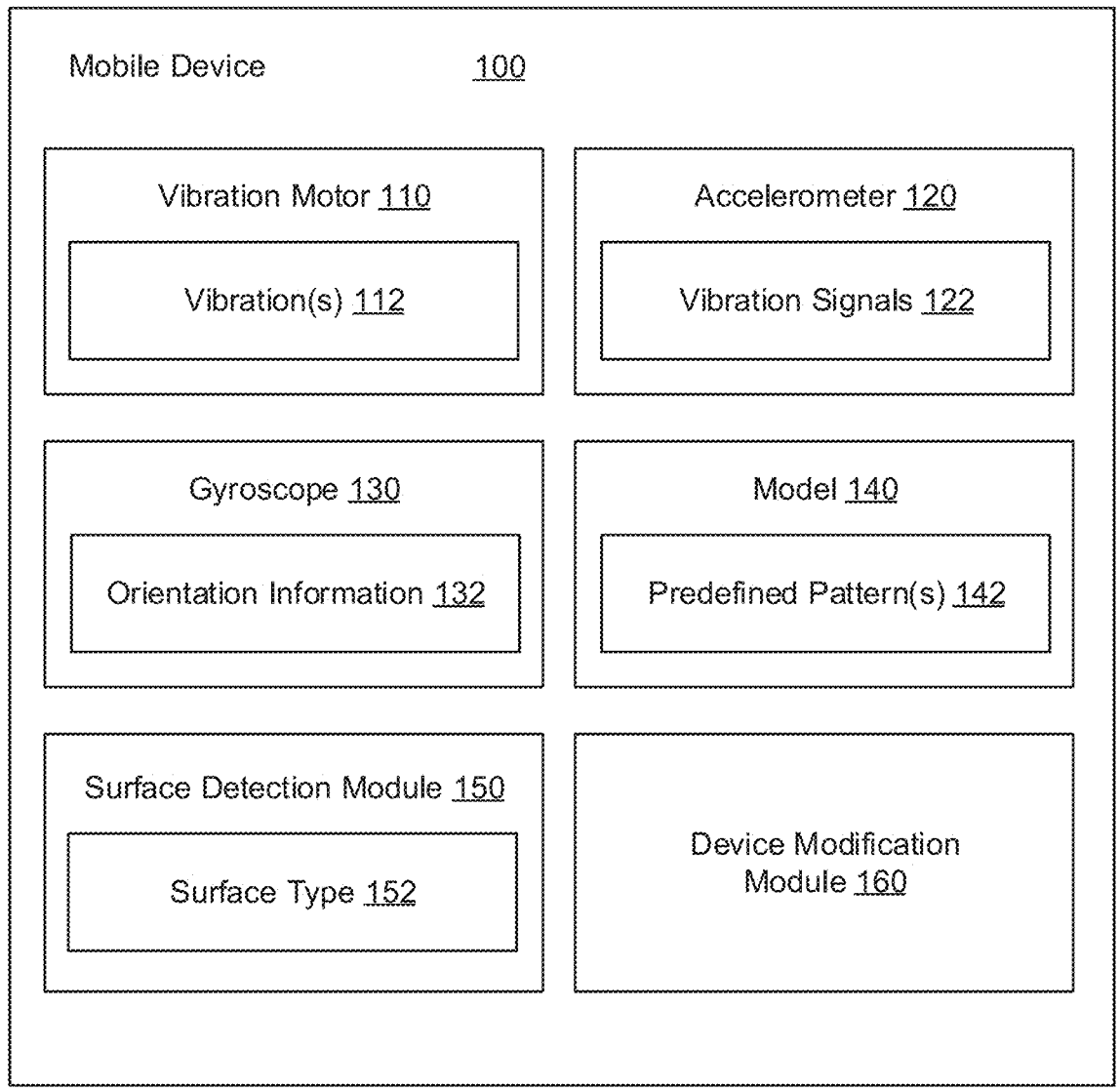
FIG. 1 illustrates a mobile device operable to determine a type of surface on which the mobile device resides in accordance with an example embodiment.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various technology embodiments. One skilled in the relevant art will recognize, however, that such detailed embodiments do not limit the overall technological concepts articulated herein, but are merely representative thereof.

As used in this written description, the singular forms "a," "an" and "the" include express support for plural referents unless the context clearly dictates otherwise. Thus, for example, reference to "a motor" includes a plurality of such motors.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a sensor with "increased" sensitivity can refer to a sensor in a sensor array which has a lower level or threshold of detection than one or more other sensors in the array. A number of factors can cause such increased sensitivity, including materials, configurations, architecture, connections, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

Humans can act and react depending on a situation, an environment or a context of the environment. Providing mobile devices, such as smart phones, with a capability to sense the environment context can be a desirable feature in order to better understand user behavior, and create an improved user experience to his or her preferences. Mobile devices are known to include sensors for location (e.g., global positioning system (GPS)), orientation (e.g., gyroscope), and movement (e.g., accelerometer). However, since information about a mobile device's immediate surroundings can also be useful, it would be beneficial for the mobile device to include a sensor or technique for detecting characteristics of a surface that supports the mobile device (e.g., a surface on which the mobile device resides). This is particularly true when the mobile device is in an idle state. For example, the ability to determine a type of material of the surface on which the mobile device resides, a position of the mobile device on the surface (e.g., a table), whether the mobile device is currently being held in a user's hand, whether the mobile device is inside of a bag or in a pocket, could be very useful.

Accordingly, in one example, with the aid of existing third-party applications and services, a mobile device can automatically modify its configurations based on the mobile device's location, e.g., home, work, city park, etc. The mobile device can use signals from cell towers, Wi-Fi networks and/or GPS coordinates to configure its settings. This auto configuration can include performing various functions, such as turning on/off a Wi-Fi card according to a geographical position using GPS, opening an application such as a music player depending on a time of day, adjusting volume setting according to a Bluetooth paring, turning off Wi-Fi and Bluetooth at work to save battery, muting the mobile device in a particular location (e.g., a library), turning off data roaming when the mobile device reaches a particular location (e.g., an airport), etc. These previous solutions can be based on the geographical location of the mobile device and not based on the mobile device's relative position.

In one example, these previous solutions for modifying a mobile device's configurations based on the location of the mobile device can depend on external signals received from cell towers, Wi-Fi networks and/or GPS coordinates. When the mobile device is not in reach of those external signals, the mobile device does not know its location. Cell towers can be built by carrier companies and an end user is generally agnostic as to which tower is connected and its physical location. While Wi-Fi can be controlled by users, often times those signals are private and not open for public access. Some Wi-Fi modems may not be connected to an external network such as the Internet, and it can be difficult to fetch location data without an external connection. GPS suffers from various disadvantages, such as an inability to be reliably used indoors in cities with a high density of buildings. Thus, GPS can be useful outdoors and with a certain error margin. However, these external signals only provide the mobile device with an ability to know its location according to a geographical position, but cannot provide information on where the mobile device is according to its own position.

Thus, the previous solutions cannot collect additional information that can be useful for certain applications, such as determining whether a mobile device is in a women's bag, over a table, in a car, in a back pocket of a user's jeans, etc. In other words, the previous solutions cannot collect additional information (e.g. about the device's immediate environment) that can be used for determining a surface on which the mobile device resides.

In the present technology, a mobile device can include a vibration motor (or unbalance motor) (e.g., to generate vibrations used as feedback to a user for notifications of incoming calls, messages, alerts, etc.), an accelerometer to detect a movement of the mobile device, and a gyroscope to determine an orientation of the mobile device. The mobile device can generate a vibration using the vibration motor. The mobile device can capture resulting signals using the accelerometer. In other words, the accelerometer can be used to capture resulting signals that reflect or measure how the mobile device reacts to the vibration stimuli. The vibration motor can generate the vibration stimuli and the effect produced on the mobile device can be captured using the accelerometer. The mobile device propagation of vibration modes can react differently depending on the surface on which the mobile device is touching, e.g., soft surfaces can produce a different pattern as compared to solid surfaces. Based on this knowledge along with orientation information extracted from a gyroscope of the mobile device, additional information can be connected to infer a context of a possible location of the user's mobile device. In other words, based on the signals produced when the mobile device vibrates and knowledge about different patterns for different surfaces, a surface on which the mobile device resides (e.g., soft surface, solid surface, table, inside a bag) can be detected.

In the present technology, inherent sensors embedded in mobile devices can be used to extract and process data that can be used to enable the mobile device with capabilities of context understanding, which are not possible with traditional network and/or GPS location services. Therefore, the mobile device can be provided with an ability of understanding the user's usage when being left on a table, being carried inside a bag or a pocket, being left in a car, etc.

In one example, an ability or capability of a mobile device to perform a contextual surface detection can enable new functionalities in terms of personalization and content preferences. For example, a display of the mobile device may not be turned off or the mobile device may not be locked when the mobile device is determined to be residing on a user's hand (i.e., the mobile device is currently being held by the user). In another example, a notification volume (e.g., a ring volume) of the mobile device can be increased when the mobile device is determined to be residing inside of a bag, purse, or other container. In another example, the mobile device can vibrate, but not produce an audible notification when the mobile device is determined to be residing on a user's hand. In addition, the surface context awareness enables various applications that can expand to gaming.

FIG. 1 illustrates an example of a mobile device 100 operable to determine a surface type 152 on which the mobile device 100 resides. The surface type 152 on which the mobile device 100 resides can be determined when the mobile device 100 is idle or is currently being unused by a user. The mobile device 100 can include a vibration motor 110 (or unbalance motor) operable to generate vibration(s) 112, which can be used as feedback to a user for notifications of incoming calls, messages, alerts, etc. The mobile device 100 can include an accelerometer 120 to detect a movement of the mobile device 100. For example, the accelerometer 120 can capture vibration signals 122 that result from the vibration 112 generated by the vibration motor 110. In other words, the vibration 112 can cause the mobile device 100 to move, and the accelerometer 120 can detect that movement of the mobile device 100 and produce the vibration signals 122 (which correspond with or characterize the mobile device's movement). In addition, the mobile device 100 can include a gyroscope 130 to collect orientation information 132 for the mobile device 100.

In one example, the mobile device 100 can include a smart phone or a tablet computer. In another example, the mobile device 100 can include a smart watch or another type of handheld or mobile computing device.

In one configuration, the mobile device 100 can include a surface detection module 150. The surface detection module 150 can receive a plurality of vibration signals 122 from the accelerometer 120, and the vibration signals 122 can correspond with or characterize the movement of the mobile device 100 due to the vibration 112 produced by the vibration motor 110. The surface detection module 150 can provide the vibration signals 122 to a model 140 running on the mobile device 100. The model 140 can include a plurality of predefined patterns 142 that correspond to vibration signals produced by mobile devices residing on different surfaces. The plurality of predefined patterns 142 can correspond to different surfaces on which the mobile device 100 is potentially residing and can account for whether the mobile device 100 includes or does not include a case. The surface detection module 150 can identify, using the model 140, a predefined pattern 142 in the plurality of predefined patterns 142 that substantially corresponds to the plurality of vibration signals 122. The corresponding predefined pattern 142 that is identified can be associated with a specific type of surface or a predefined type of surface (e.g., a laptop surface). The surface detection module 150 can determine a surface type 152 (e.g., a laptop surface) on which the mobile device 100 resides based on the predefined pattern 142 identified using the model 140.

In one example, the surface detection module 150 can receive the orientation information 132 from the gyroscope 130. The surface detection module 150 can provide the orientation information 132 to the model 140. The surface detection module 150 can identify, using the orientation information 132 provided to the model 140, the predefined pattern 142 that substantially corresponds to the vibration signals 122. In other words, the orientation information 132 can be used along with the vibration signals 122 in identifying the predefined pattern 142 that substantially corresponds to the vibration signals 122. The predefined pattern 142 that is identified can be associated with a predefined type or orientation, which can correspond with the orientation information 132 received from the gyroscope 130.

In one example, the model 140 can incorporate the predefined patterns 142 that correspond to the different surfaces, and the different surfaces can include, but are not limited to, a clothing surface, a container surface, a soft surface, a rigid surface, a hand surface, a leather surface, a wood surface or a paper surface. The predefined patterns 142 can be previously generated for each of the different types of surfaces. For example, a first predefined pattern can be created for a clothing surface, a second predefined pattern can be created for a soft surface, and so on. The predefined patterns 142 can include vibration signals that are produced for each of the particular surfaces when a mobile device is residing on the particular surface.

In one example, the mobile device 100 can include a device modification module 160 to modify a functionality of the mobile device 100 based on the detected surface type 152 on which the mobile device 100 resides. The device modification module 160 can also modify a user preference or setting based on the detected surface type 152 on which the mobile device 100 resides. For example, the device modification module 160 can determine to not turn off a display of the mobile device 100 when the surface type 152 is a user's hand (i.e., the mobile device is currently being held by the user). In another example, the device modification module 160 can determine to not lock the mobile device 100 when the surface type 152 is the user's hand. In another example, the device modification module 160 can increase a notification volume (e.g., a ring volume) of the mobile device 100 when the surface type 152 is an inside of a bag. In another example, the device modification module 160 can determine to vibrate but not produce an audible notification when the surface type 152 is the user's hand. In another example, the device modification module 160 can determine to produce an audible notification but not vibrate when the surface type 152 is concrete to avoid scratching the mobile device 100. Therefore, depending on the surface type 152 detected for the mobile device 100, the device modification module 160 can modify a functionality of the mobile device 100 or a user preference/setting.

In one configuration, the surface detection module 150 can identify, using the model 140, one or more predefined patterns 142 in the plurality of predefined patterns 142 that correspond to the vibration signals 122. The surface detection module 150 can assign a confidence level to each of the identified one or more predefined patterns 142. The surface detection module 150 can select a predefined pattern 142 with a highest confidence level among the one or identified more predefined patterns 142. In other words, as an example, if the surface detection module 150 identifies four predefined patterns that correspond to the vibration signals 122 with confidence ratings of 88%, 86%, 90% and 89%, respectively, the surface detection module 150 can select the predefined pattern 142 that corresponds to the confidence rating of 90%, and the specific type of surface associated with the selected predefined pattern 142 can indicate the surface type 152 of the mobile device 100.

As a non-limiting example, a smart phone can be inside a user's coat pocket, but the smart phone is initially not aware of its location inside the user's coat pocket. In order to determine the smart phone's location, the smart phone can generate a vibration using a vibration motor, and an accelerometer within the smart phone can capture vibration signals resulting from the smart phone's movement due to the vibration. The vibration signals can be compared with a database of patterns. For example, the database can include a first pattern that corresponds to a surface representing an inside of a coat, a second pattern that corresponds to a surface representing an inside of a bag, a third pattern that corresponds to a foam surface, a fourth pattern that corresponds a hand surface, a fifth pattern that corresponds to a leather surface, a sixth pattern that corresponds to a laptop surface, a seventh pattern that corresponds to a wood surface, an eight pattern that corresponds to a paper surface, and so on. Based on the comparison between the vibration signals and the database, the first pattern that corresponds to the surface representing an inside of a coat can be identified as most closely matching the vibration signals. As a result, a determination can be made that the smart phone is inside the user's coat pocket.

In one example, the model 140 used by the surface detection module 150 to determine the surface type 152 associated with the mobile device 100 can be a neural network or a machine learning model. In another example, the model 140 can include, but is not limited to, an artificial intelligence (AI) model, a support vector machine, a Bayesian network, a genetic algorithm, etc. The model 140 can use predictive analytics, supervised learning, semi-supervised learning, unsupervised learning, reinforcement learning, etc.

In one configuration, the model 140 can be generated and trained using training data. The training data can include the predefined patterns 142. The model 140 can be trained to identify different surface types for the mobile device 100. In addition, the model 140 can continue to receive additional training data (or additional predefined patterns 142) over time, in order to recognize new types of surface types on which the mobile device 100 can potentially reside (e.g., a grass surface, a concrete surface). Therefore, the model 140 can continually mature and improve over time, and enable the surface detection module 150 to accurately determine the surface type 152 for the mobile device 100.

In one example, the model 140 can be generated and trained using a server (not shown), and the model 140 can be downloaded to the mobile device 100. The model 140 can run locally on the mobile device 100. The model 140 can be periodically updated by downloading a new version of the model 140 from the server, where the new version of the model 140 can incorporate additional types of surfaces.

Figure 2:
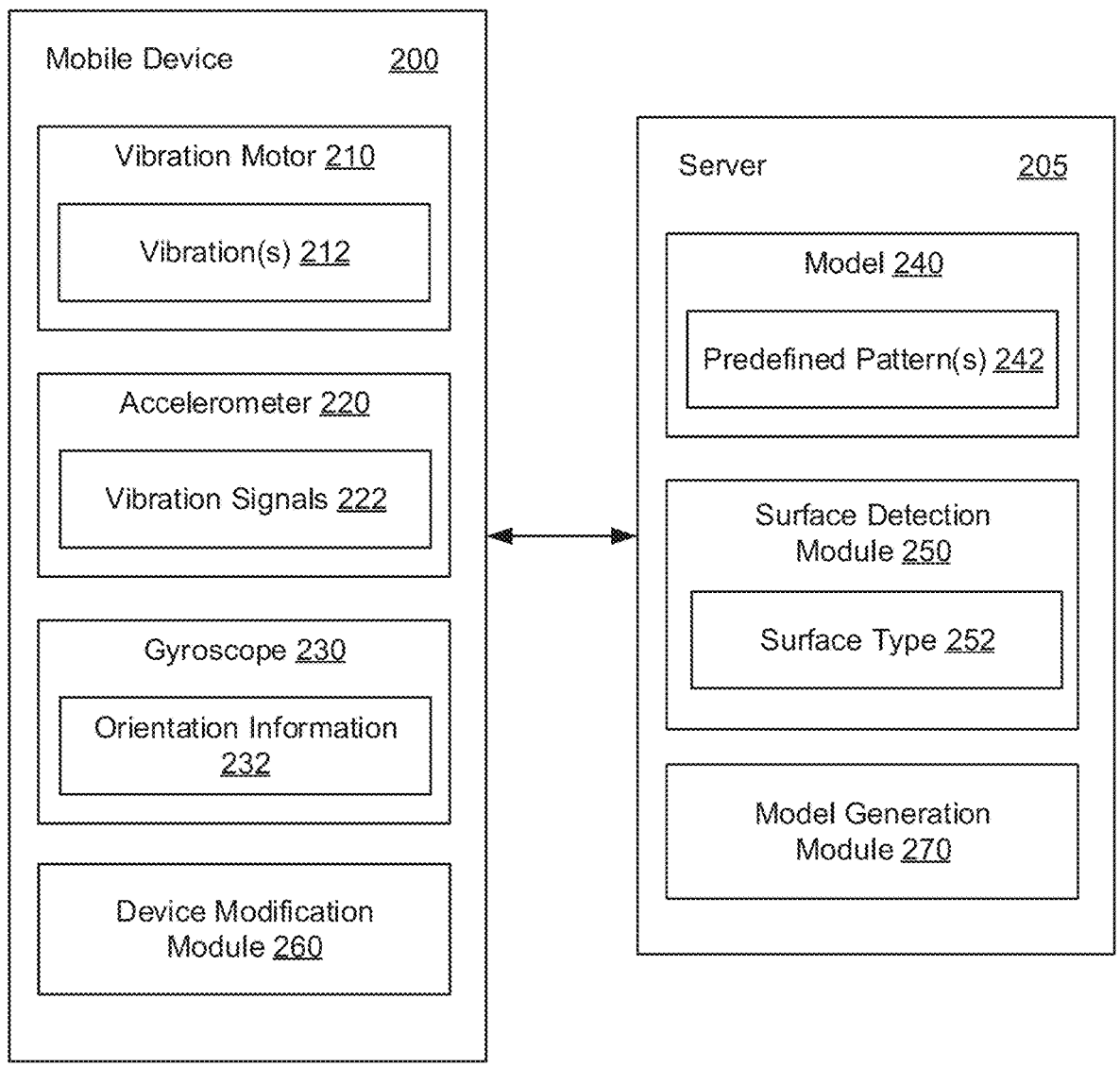
FIG. 2 illustrates a server operable to determine a type of surface on which a mobile device resides in accordance with an example embodiment.

FIG. 2 illustrates an example of a server 205 operable to determine a surface type 252 on which a mobile device 200 resides. The mobile device 200 can include a vibration motor 210 for generating vibration(s) 212, an accelerometer 220 for capturing vibration signals 222, and a gyroscope 230 for determining orientation information 232 of the mobile device 200. In addition, the mobile device 200 can include a device modification module 260 for modifying a functionality or a user preference/setting of the mobile device 200 based on the detected surface type 252 on which the mobile device 200 resides.

In one example, the server 205 can include a surface detection module 250. The surface detection module 250 can receive the vibration signals 222 from the mobile device 200 via a transceiver (not shown) in the mobile device 200, where the vibration signals 222 correspond to the vibration 212 generated at the mobile device 200. The surface detection module 250 can provide the vibration signals 222 to a model 240 (e.g., a neural network or a machine learning model) running on the server 205. The model 240 can include a plurality predefined patterns 242 that correspond to vibration signals produced by mobile devices residing on different surfaces. The surface detection module 250 can identify, using the model 240, a predefined pattern 242 in the plurality of predefined patterns 242 that substantially corresponds to the vibration signals 222. For example, the identified predefined pattern 242 may substantially correspond to the vibration signals 222 when a confidence level of the match exceeds a defined threshold. The predefined pattern 242 can be associated with a predefined type of surface (e.g., a metallic surface). The surface detection module 250 can determine the surface type 252 on which the mobile device 200 resides based on the predefined pattern 242 identified using the model 240.

In one example, the surface detection module 250 can receive the orientation information 232 from the mobile device 200 via the transceiver in the mobile device 200. For example, when resting on a horizontal surface, the orientation information 232 can indicate, whether the mobile device 200 is lying face down (i.e. on a side that has a screen in contact with the surface), or the mobile device 200 is lying face up (i.e. back side of the phone is in contact with the surface). Many mobile devices have different shapes or configurations between the front and back sides. For example, the front side of the device may be flat or substantially flat, while the back side of the device may include a bump or other protrusion to accommodate a camera lens. Such a protrusion may cause the device to lie at an angle. Alternatively, the back side may have a curved shape, such that a small amount of material is in contact with the underlying surface when the device is face up as compared to when the device is face down and a flat screen is in contact with the surface. Depending on which side of the mobile device 200 is in contact with an underlying surface, the vibration signals 222 can differ for the mobile device 200. The surface detection module 250 can provide the orientation information 232 to the model 240 running on the server 205. The surface detection module 250 can identify, using the orientation information 232 provided to the model 240, the predefined pattern 242 in the plurality of predefined patterns 242 that substantially corresponds to the vibration signals 222. In other words, both the vibration signals 222 and the orientation information 232 can be used to identify the predefined pattern 242 that substantially corresponds with the vibration signals 222.

In one example, the server 205 can send an indication of the surface type 252 to the mobile device 200. The mobile device 200 can receive the notification, and the device modification module 260 can modify a functionality of the mobile device 200 accordingly.

In one example, the device modification module 260 can modify a functionality of the mobile device 200 based on the indication of the surface type 252 received from the server 205. The device modification module 260 can also modify a user preference or setting based on the surface type 252 on which the mobile device 200 resides. For example, the device modification module 260 can determine to turn off a Wi-Fi module in the mobile device 200 when the surface type 252 is a user's back pocket or bag. In another example, the device modification module 260 can determine to leave functionalities on when the surface type 252 is a table, since the user can likely pick up the mobile device 200 periodically from the table to use the mobile device 200. In another example, the device modification module 260 can determine to not lock the mobile device 200 when the surface type 252 is the user's hand. In another example, the device modification module 260 can increase a notification volume (e.g., a ring volume) of the mobile device 200 when the surface type 252 is an inside of a bag. In another example, the device modification module 260 can determine to vibrate but not produce an audible notification when the surface type 252 is the user's hand. In another example, the device modification module 260 can determine to produce an audible notification but not vibrate when the surface type 252 is hard and potentially abrasive (e.g. concrete) to avoid scratching the mobile device 200.

In one example, the surface detection module 250 can determine the surface type 252 of the mobile device 200 when the mobile device 200 is in an idle mode and/or when the mobile device 200 is not currently in use by the user. For example, when the mobile device 200 is being held and used by the user (e.g., for making a phone call or sending a text message or browsing the internet), the surface detection module 250 may not determine the surface type 252 of the mobile device 200. The surface detection module 250 can determine the surface type 252 of the mobile device 200 after the user stops using the mobile device 200 (e.g., after the mobile device 200 is placed on a surface).

In one example, the surface detection module 250 can determine the surface type 252 of the mobile device 200 using a vibration signal 222 that is not specifically derived from a vibration 212 generated for the purpose of determining the surface type 252. For example, the mobile device 200 can generate the vibration 212 when the mobile device 200 receives a phone call, text message, electronic message, etc. In other words, the mobile device 200 can generate the vibration 212 based on an event (e.g. a non-sensory event) that triggers the vibration 212. While originating for a different purpose, the vibration 212 can be taken advantage of by sending, the resulting vibration signals 222 from the mobile device 200 to the server 205, and the surface detection module 250 can determine the surface type 252 using the vibration signals 222.

In one example, the server 205 can include a model generation module 270 to generate the model 240 to include the predefined patterns 242. For example, the model generation module 270 can receive a plurality of training vibration signals when a training vibration is generated for a predefined type of surface (e.g., a leather surface). The model generation module 270 can apply linear predictive coding (LPC) to the plurality of training vibration signals. The model generation module 270 can generate a predefined pattern 242 that corresponds to the predefined type of surface (e.g., the leather surface) using the plurality of training vibration signals. The model generation module 270 can repeat this process for a plurality of predefined surface types (e.g., inside a bag, inside a coat, foam, hand, leather, laptop, wood, paper and so on). In other words, the model generation module 270 can generate a predefined pattern 242 for each surface type 252. In addition, the model generation module 270 can train and test the model 240 using the predefined patterns 242 that corresponds to the different surface types.

In one configuration, the surface type 252 of the mobile device 200 can be determined at the server 205 rather than at the mobile device 200 itself, as shown in FIG. 1. This can reduce an amount of computation performed at the mobile device 200. In addition, the server 205 can generate and maintain the model 240, and the server 205 can update the model 240 over time. In this configuration, the model 240 may not be provided to the mobile device 200, but rather remain on the server 205.

In one configuration, the mobile device 200 can execute an application to determine a composition of an object. For example, the mobile device 200 can be placed on the object, and the application can trigger a series of vibrations 212 to be generated at the mobile device 200. Based on vibration signals 222 resulting from the vibrations 212, the application can provide a suggestion of the object's composition. The application can be used to determine whether the composition of the object on which the mobile device 200 resides (or otherwise contacts) is metal, wood, fabric, etc. based on the vibration signal 222 resulting from the vibrations 212 of the mobile device 200.

Figure 3A:
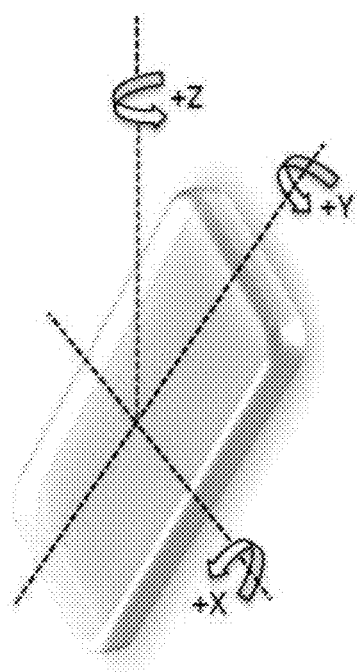
FIG. 3A illustrates gyroscope orientation movements in accordance with an example embodiment.

FIG. 3A illustrates an example of gyroscope orientation movements. A gyroscope is a device that uses Earth's gravity to accurately measure orientation. The gyroscope's design can include a freely-rotating disk referred to as a rotor, mounted onto a spinning axis in the center of a larger and more stable wheel. As the axis turns, the rotor can remain stationary to indicate the central gravitational pull, and thus which way is "down".

Figure 3B:
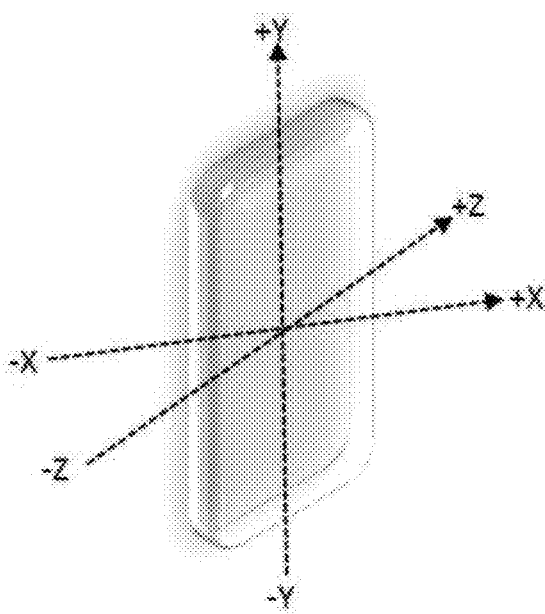
FIG. 3B illustrates accelerometer linear acceleration movements in accordance with an example embodiment.

FIG. 3B illustrates an example of accelerometer linear acceleration movements. An accelerometer is a compact device designed to measure non-gravitational acceleration. When an object containing the accelerometer changes from idle to movement, the accelerometer can be designed to respond to the changes in acceleration associated with such rapid changes.

Figure 4:
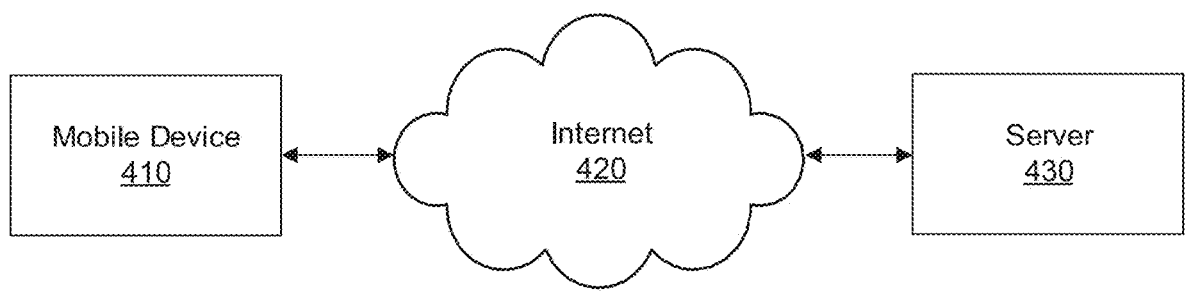
FIG. 4 illustrates a client-server model for data collection in accordance with an example embodiment.

FIG. 4 illustrates an example of a client-server model for data collection. A mobile device 410 (or client) can send data to a server 430 over an internet 420. The data can include accelerometer data and/or gyroscope data. For example, the mobile device 410 can capture the accelerometer data and the gyroscope data using an accelerometer and a gyroscope, respectively, that is onboard the mobile device 410, and then send that data to the server 430 over the internet 420. In one example, the server 430 can be a user datagram protocol (UDP) server. UDP can be used for establishing low-latency and loss-tolerating connections between applications on the internet 420.

Figure 5:
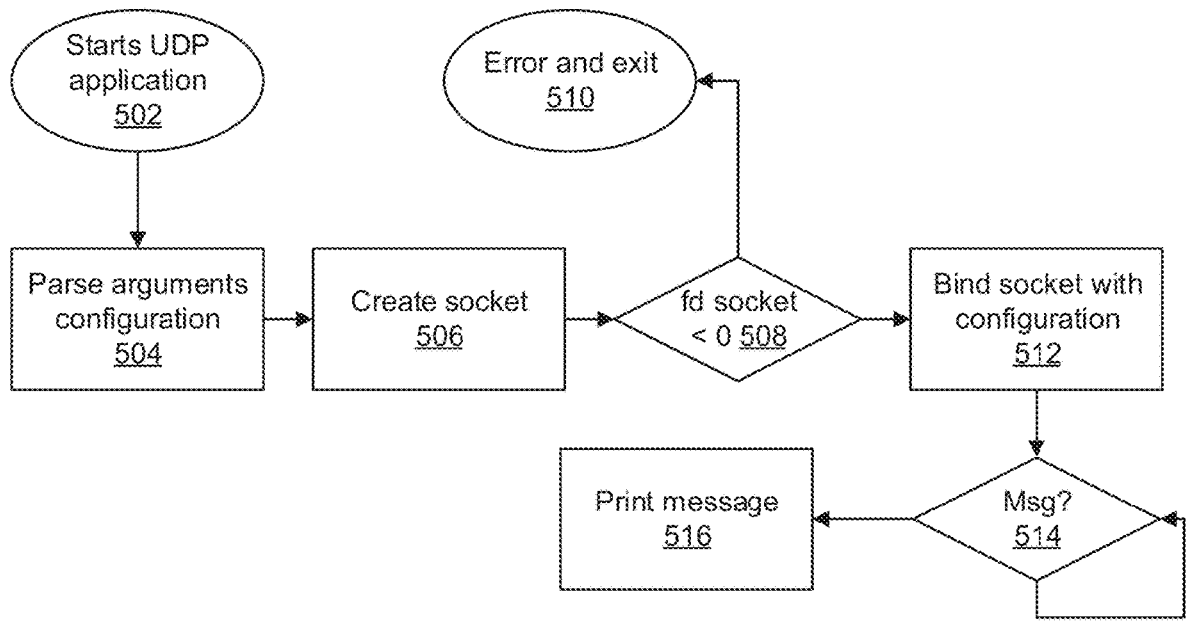
FIG. 5 illustrates functionality of a server collecting sensor information in accordance with an example embodiment.

FIG. 5 illustrates an example of functionality of a server collecting sensor information. For example, the server can start an application (e.g., a UDP application) that creates a network socket and receives sensor information via the network socket. More specifically, a UDP application can be started at the server (block 502), an arguments configuration can be parsed (block 504), and the network socket can be created by the server (bock 506). When a file descriptor (FD) of the network socket is less than zero (block 508), the UDP application can generate an error and the UDP application can be exited or closed (block 510). When the FD of the network socket is not less than zero, the UDP application can bind the network socket with the arguments configuration (block 512). When a message is received via the network socket (block 514), such as a message that includes sensor information, the message can be printed at the server (block 516).

Figure 6:
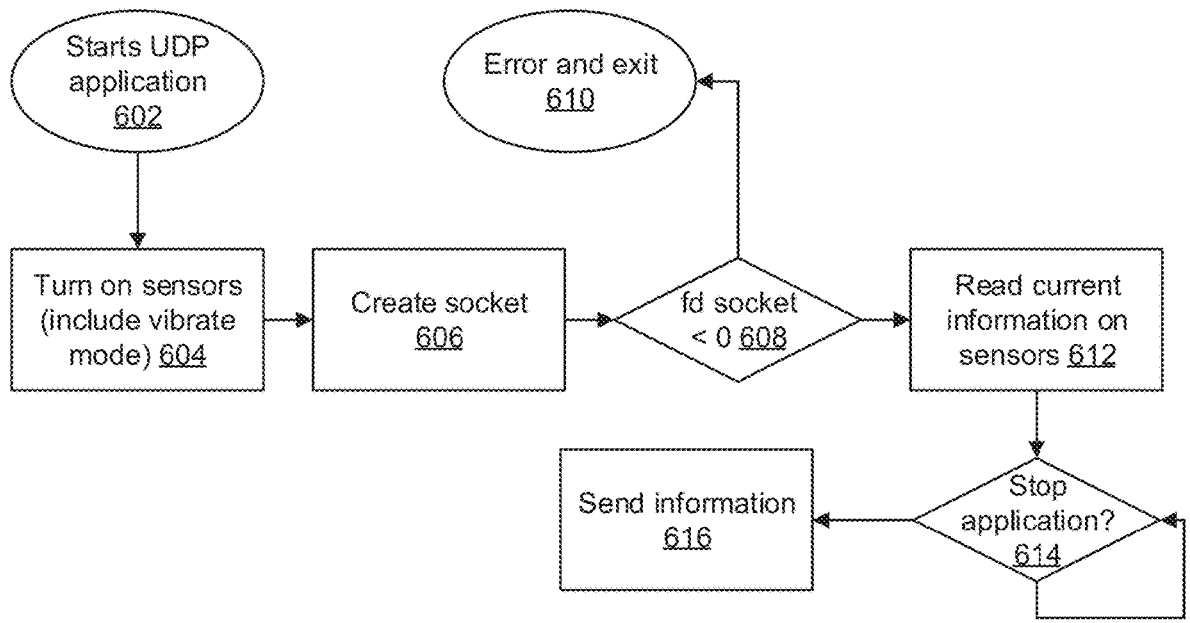
FIG. 6 illustrates functionality of a mobile device sending sensor information in accordance with an example embodiment.

FIG. 6 illustrates an example of functionality of a mobile device sending sensor information. For example, the mobile device can start an application (e.g., a UDP application) that turns on the mobile device's sensors (while the mobile device is in a vibrate mode) and creates a network socket. The mobile device can read current sensor information and send that information via the network socket. More specifically, a UDP application can be started at the mobile device (block 602), one or more sensors can be turned on at the mobile device including a vibrate mode (block 604), and the network socket can be created at the mobile device (bock 606). When a file descriptor (FD) of the network socket is less than zero (block 608), the UDP application can generate an error and the UDP application can be exited or closed (block 610). When the FD of the network socket is not less than zero, the UDP application can read current information on the sensors (i.e., sensor information) (block 612). When the UDP application is stopped at the mobile device (block 514), the application on the mobile device can send the sensor information via the network socket (block 616).

In one example, as a reference, additional data was collected during experimentation using an external accelerometer at 16 kilohertz (Khz), under the six different environments. The six different environments corresponded to six different experimental set ups used for data collection, where different surfaces and orientations where explored. The surfaces included a laptop surface, a hand surface, a leather surface, a semi-soft surface, a soft surface and a bag surface (i.e., inside a bag). For each surface, data was collected and features in the form of linear predictive coding (LPC) descriptors were computed. These features were provided into a neural network training procedure, as described below.

In one example, LPC is a widely used technique in signal processing to analyze, restore, or reproduce physical time series signals. Certain types of Linear Time-Invariant (LTI) signals can benefit from LPC. The type of signals best suited for LPC are slow-varying, and produced in short intervals or infrequent briefs pulses. LPC provides a small but accurate representation of a source signal spectral magnitude. The human voice is a typical candidate for LPC analysis, used in different speech applications. The basic principle of LPC consists of modeling a signal as a linear combination of its past and present values. In the frequency domain, it is similar to taking the signal spectrum by a pole-zero spectrum. One of the preconditions to use LPC is to have a base model to allow reconstruction. This model can be used in order to be the closer to the source signal representation. The LPC model can consider a signal $s_n$ to be an output of some unknown input $u_n$ so that the following holds:

$$s_n = \sum_{k=1}^{p} a_k s_{n-k} + G \sum_{l=0}^{q} b_l u_{n-l} \quad \text{(Equation 1)}$$

where $a_k$, $1 \leq k \leq p$, $1 \leq l \leq q$ and G are parameters of the base-model. The above equation calculates the predicted signal $s_n$ from the linear combination of past outputs and present inputs.

In the frequency domain, applying a Z transform to both sides of Equation 1 and assuming H(z) is the transfer function results in the following:

$$H(z) = \frac{S(z)}{U(z)} = G \frac{1 + \sum_{l=1}^{q} b_l z^{-l}}{1 + \sum_{k=1}^{p} a_k z^{-k}} \quad \text{(Equation 2)}$$

where $$S(z) = \sum_{n=-\infty}^{\infty} S_n z^{-n}. \quad \text{(Equation 3)}$$

In one example, Equation 3 is the S(z) transform of $s_n$, and U(z) is z transform of $u_n$. H(z) is the general pole-zero model. For LPC, there is a special case of having bl=0, $1 \leq l \leq q$, and this is also known as an all pole model.

In one example, one concern with the linear predictive model is calculating the coefficients $a_k$ and G (gain). One technique that can be used for calculating the coefficients in LPC is a least squares technique. The least squares technique assumes that the predicted signal s(n) can be approximated from a linearly weighted summation of past samples. The residual or error can be the subtraction of the actual signal from the predicted signal. The parameter $a_k$ can be obtained from the minimization of the mean. Other techniques for estimating the coefficients include autocorrelation and covariance techniques. In addition, regarding G (gain), LPC assumes that G can be determined by matching the signal energy to the energy of the linear predicted outputs.

In one example, LPC can provide several advantages. For example, LPC can remove redundancy of the signal, and the coefficient can provide a model for unknown samples. In addition, LPC can provide a prediction of future points by estimating future samples of a discrete signal based on a linear prediction of previous samples.

In one configuration, LPC can be applied to each of the six different environments corresponded to six different experimental set ups used for data collection, including a laptop surface, a hand surface, a leather surface, a semi-soft surface, a soft surface and a bag surface (i.e., inside a bag). By applying LPC to each of the six different surfaces, a database of patterns can be generated, and the database of patterns can be used to perform training of a neural network (NN).

Figure 7:
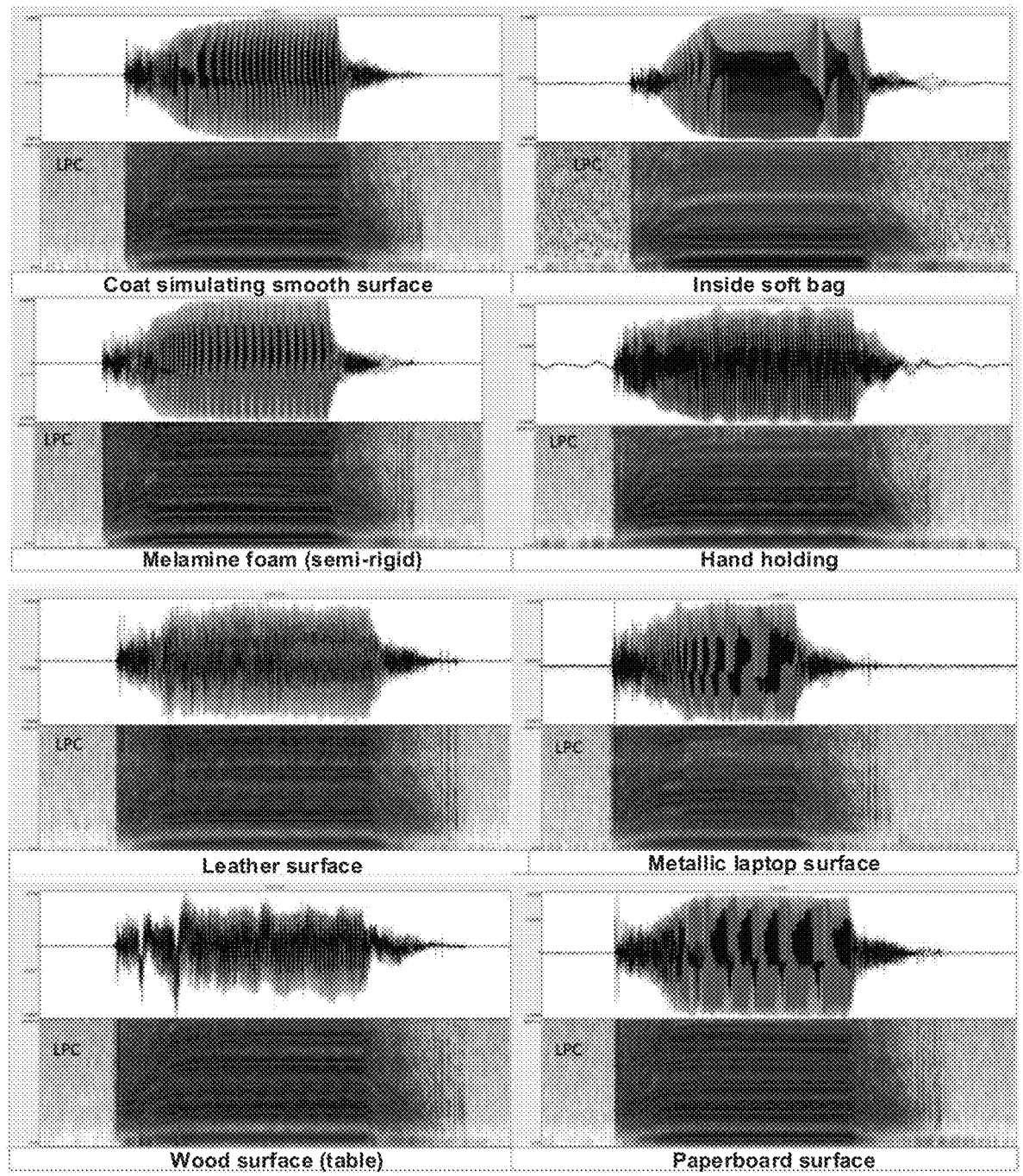
FIG. 7 illustrates predefined patterns that correspond to different surfaces and orientations in accordance with an example embodiment.

FIG. 7 illustrates an example of patterns (or predefined patterns) that correspond to different surfaces and orientations on which a mobile device resides. The patterns can correspond to a coat simulating a smooth surface, an inside of a soft bag, melamine foam (semi-rigid), a hand (i.e., the surface is a user's hand), a leather surface, a metallic laptop surface, a wood surface (table) and a paperboard surface. In other words, a mobile device in an idle state was placed in each of the different surfaces, and the corresponding pattern for each of the different surfaces was generated. As previously explained, the patterns can be generated by applying LPC to each of the different surfaces.

In one example, differences among the different obtained patterns can be visible. The collected patterns can be used to train a NN with a topology of an input layer of 4,356 neurons, two hidden layers of 20 neurons each, and 8 neurons at the output representing each one of the obtained patterns (corresponding to the different surfaces). In one example, an optimization technique used to find the weights can be gradient descent.

In one example, for experimentation, 60% of the collected patterns can be used for training, and the remaining 40% can be used for evaluation of the trained NN model. The surface recognition results (e.g., percentage of correct surfaces detected) are shown below:

| Surface | Training | Testing |
|---|---|---|
| 1 | 100% | 100% |
| 2 | 100% | 100% |
| 3 | 100% | 80% |
| 4 | 100% | 100% |
| 5 | 100% | 100% |
| 6 | 100% | 100% |
| 7 | 100% | 100% |
| 8 | 100% | 100% |

In the above table, #1 corresponds to an inside of a coat, #2 corresponds to an inside of a bag, #3 corresponds to a foam surface, #4 corresponds to a hand (i.e., the surface is a user's hand), #5 corresponds to a leather surface, #6 corresponds to a laptop surface, #7 corresponds to a wood surface, and #8 corresponds to a paperboard surface. Based on these results, it can be feasible to use an embedded sensor (e.g., an accelerometer) in a mobile device to detect surfaces on which the mobile device is placed or resides when the mobile device is idle, which can be used to infer a situation context. A similar approach can be used with access to data collected from a gyroscope and/or a magnetometer to use orientation data.

Figure 8:
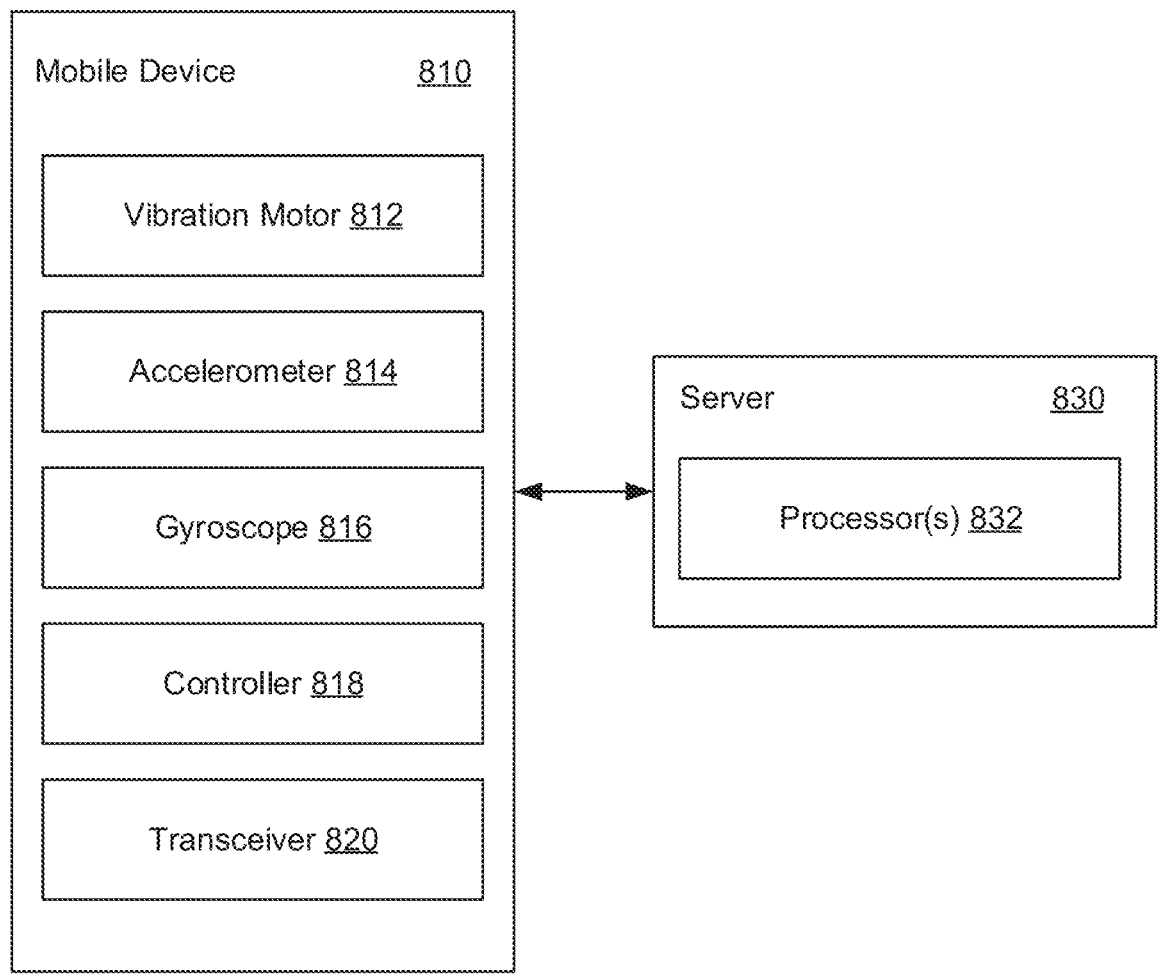
FIG. 8 illustrates a mobile device in communication with a server in accordance with an example embodiment.

FIG. 8 illustrates an example of a mobile device 810 in communication with a server 830. The mobile device 810 can include a vibration motor 812 operable to generate a vibration. The mobile device 810 can include an accelerometer 814 operable to capture a plurality of vibration signals that result from the vibration. The mobile device 810 can include a gyroscope 816 operable to capture orientation information for the mobile device 810. The mobile device 810 can include a controller 818. The controller 818 can provide the plurality of vibration signals to a model running on the mobile device 810. The model can include a plurality of predefined patterns that correspond to vibration signals produced by mobile devices residing on different surfaces. The controller 818 can identify, using the model, a predefined pattern in the plurality of predefined patterns that substantially corresponds to the plurality of vibration signals based on a confidence level that exceeds a threshold. The controller 818 can determine a type of surface on which the mobile device 810 resides based on the predefined pattern identified using the model.

In an alternative configuration, the mobile device 810 can include a transceiver 820 operable to transmit the plurality of vibration signals to the server 830. One or more processors 832 in the server 830 can receive the plurality of vibration signals from the mobile device 810. The one or more processors 832 can provide the plurality of vibration signals to a model running on the server 830. The model can include a plurality of predefined patterns that correspond to vibration signals produced by mobile devices residing on different surfaces. The one or more processors 832 can identify, using the model, a predefined pattern in the plurality of predefined patterns that substantially corresponds to the plurality of vibration signals based on a confidence level that exceeds a threshold. The predefined pattern can correspond to a predefined type of surface. The one or more processors 832 can determine the type of surface on which the mobile device 810 resides based on the predefined pattern identified using the model. The one or more processors 832 can send an indication of the type of surface to the mobile device 810.

Figure 9:
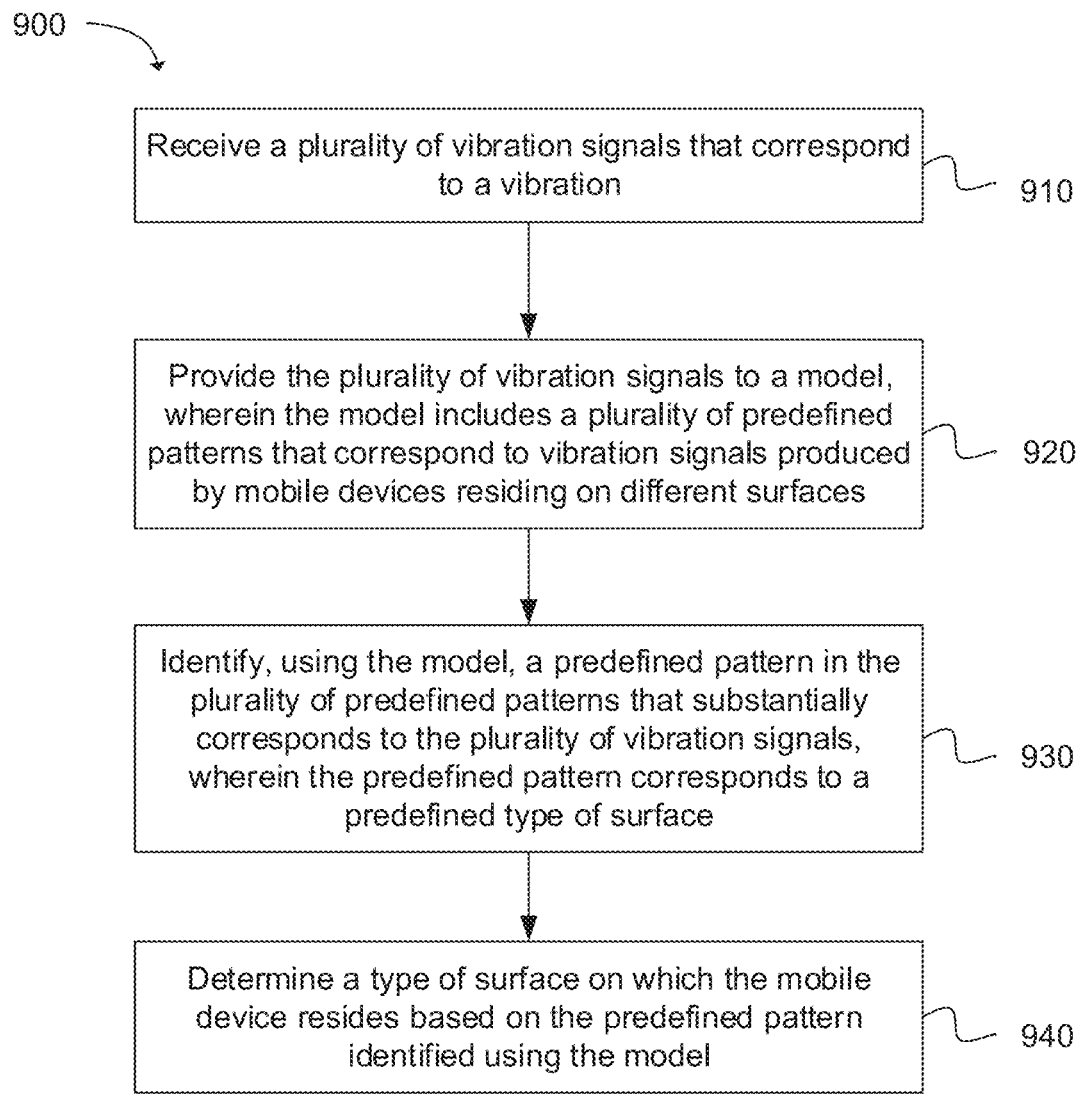
FIG. 9 is a flowchart illustrating operations for determining a type of surface on which a mobile device resides in accordance with an example embodiment.

Another example provides a method 900 for determining a type of surface on which a mobile device resides, as shown in the flow chart in FIG. 9. The method can be executed as instructions on a machine, where the instructions are included on at least one computer readable medium or one non-transitory machine readable storage medium. The method can include the operation of receiving a plurality of vibration signals that correspond to a vibration, as in block 910. The method can include the operation of providing the plurality of vibration signals to a model, wherein the model includes a plurality of predefined patterns that correspond to vibration signals produced by mobile devices residing on different surfaces, as in block 920. The method can include the operation of identifying, using the model, a predefined pattern in the plurality of predefined patterns that substantially corresponds to the plurality of vibration signals, wherein the predefined pattern corresponds to a predefined type of surface, as in block 930. The method can include the operation of determining a type of surface on which the mobile device resides based on the predefined pattern identified using the model, as in block 940.

Figure 10:
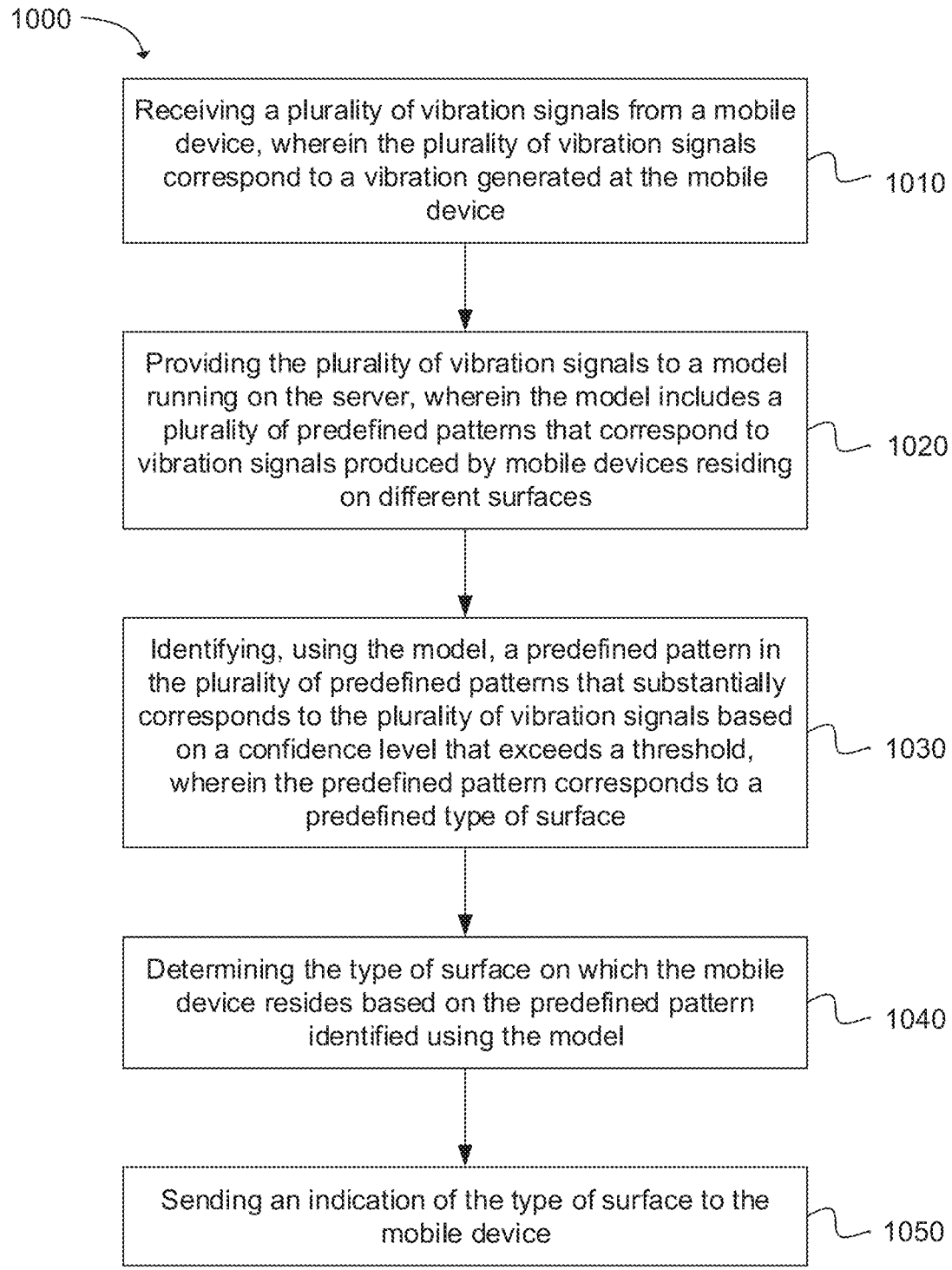
FIG. 10 is a flowchart illustrating operations for determining a type of surface on which a mobile device resides in accordance with an example embodiment.

Another example provides a method 1000 for determining a type of surface on which a mobile device resides, as shown in the flow chart in FIG. 10. The method can be executed as instructions on a machine, where the instructions are included on at least one computer readable medium or one non-transitory machine readable storage medium. The method can include the operation of receiving a plurality of vibration signals from a mobile device, wherein the plurality of vibration signals correspond to a vibration generated at the mobile device, as in block 1010. The method can include the operation of providing the plurality of vibration signals to a model running on the server, wherein the model includes a plurality of predefined patterns that correspond to vibration signals produced by mobile devices residing on different surfaces, as in block 1020. The method can include the operation of identifying, using the model, a predefined pattern in the plurality of predefined patterns that substantially corresponds to the plurality of vibration signals based on a confidence level that exceeds a threshold, wherein the predefined pattern corresponds to a predefined type of surface, as in block 1030. The method can include the operation of determining the type of surface on which the mobile device resides based on the predefined pattern identified using the model, as in block 1040. The method can include the operation of sending an indication of the type of surface to the mobile device, as in block 1050.

Figure 11:
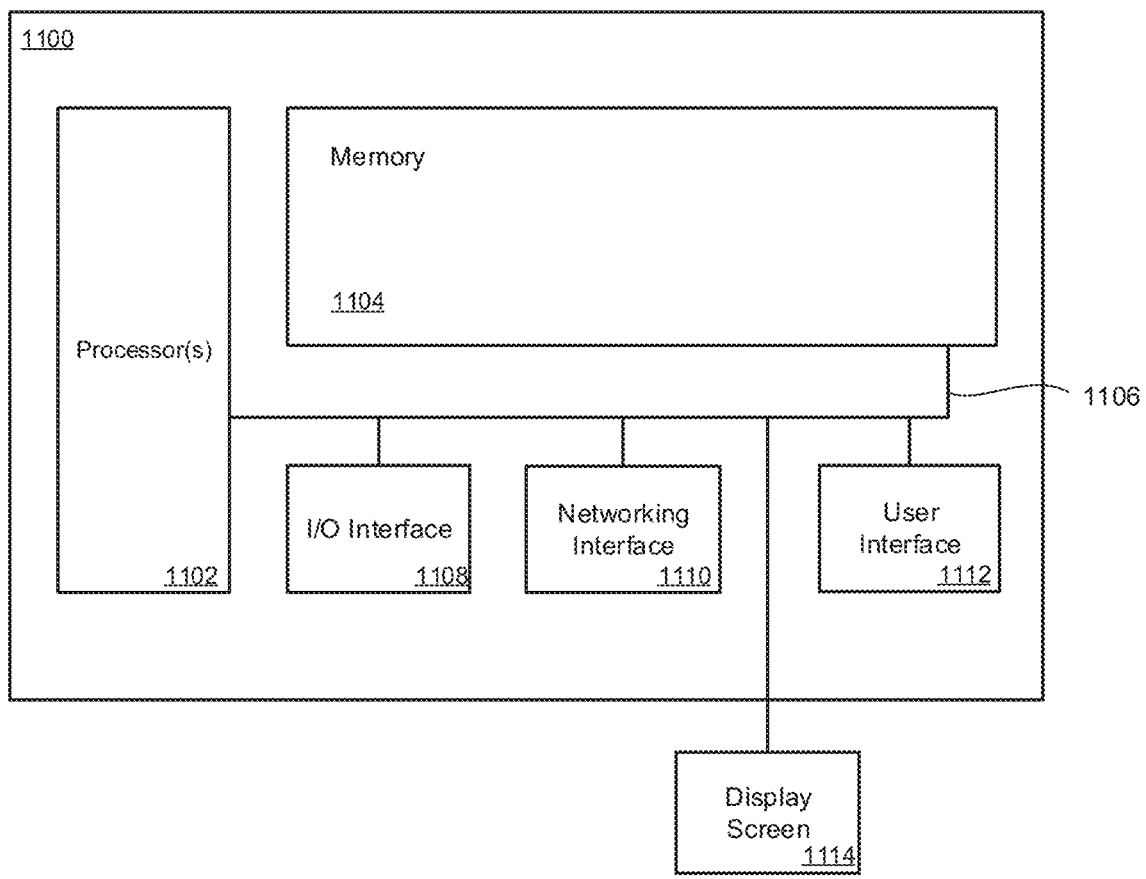
FIG. 11 illustrates a computing system that includes a data storage device in accordance with an example embodiment.

FIG. 11 illustrates a general computing system or device 1100 that can be employed in the present technology. The computing system 1100 can include a processor 1102 in communication with a memory 1104. The memory 1104 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 1100 additionally includes a local communication interface 1106 for connectivity between the various components of the system. For example, the local communication interface 1106 can be a local data bus and/or any related address or control busses as may be desired.

The computing system or device 1100 can also include an I/O (input/output) interface 1108 for controlling the I/O functions of the system, as well as for I/O connectivity to devices outside of the computing system 1100. A network interface 1110 can also be included for network connectivity. The network interface 1110 can control network communications both within the system and outside of the system. The network interface can include a wired interface, a wireless interface, a Bluetooth interface, optical interface, and the like, including appropriate combinations thereof. Furthermore, the computing system 1100 can additionally include a user interface 1112, a display device 1114, as well as various other components that would be beneficial for such a system.

The processor 1102 can be a single or multiple processors, and the memory 1104 can be a single or multiple memories. The local communication interface 1106 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific technology embodiments and point out specific features, elements, or steps that can be used or otherwise combined in achieving such embodiments.

In one example, there is provided a controller. The controller can receive a plurality of vibration signals that correspond to a vibration. The controller can provide the plurality of vibration signals to a model. The model can include a plurality of predefined patterns that correspond to vibration signals produced by mobile devices residing on different surfaces. The controller can identify, using the model, a predefined pattern in the plurality of predefined patterns that substantially corresponds to the plurality of vibration signals. The predefined pattern can correspond to a predefined type of surface. The controller can determine a type of surface on which the mobile device resides based on the predefined pattern identified using the model.

In one example of the controller, the controller can include logic to: modify a functionality of the mobile device based on the type of surface on which the mobile device resides; or modify a user preference or setting based on the type of surface on which the mobile device resides.

In one example of the controller, the controller can include logic to modify the functionality of the mobile device based on the type of surface to include one or more of: turning on or off a wireless module in the mobile device based on the type of surface, locking or unlocking the mobile device based on the type of surface, increasing or decreasing a volume of the mobile device based on the type of surface, turning on or off audio notifications for the mobile device based on the type of surface, or turning on or off vibratory notifications for the mobile device based on the type of surface.

In one example of the controller, the controller can include logic to: receive orientation information for the mobile device; provide the orientation information to the model; and identify, using the orientation information provided to the model, the predefined pattern in the plurality of predefined patterns that substantially corresponds to the plurality of vibration signals, wherein the predefined pattern further corresponds to a predefined type of orientation.

In one example of the controller, the plurality of predefined patterns correspond to different surfaces on which the mobile device is potentially residing and account for whether the mobile device includes a case, the different surfaces including one or more of: a clothing surface, a container surface, a soft surface, a rigid surface, a hand surface, a leather surface, a wood surface or a paper surface.

In one example of the controller, the plurality of vibration signals corresponds to an orientation and a position of the mobile device.

In one example of the controller, the controller can include logic to determine the type of surface on which the mobile device resides when the mobile device is not being used by a user.

In one example of the controller, the controller can include logic to determine the type of surface on which the mobile device resides when the mobile device is in an idle mode.

In one example of the controller, the controller can include logic to receive the plurality of vibration signals in response to a trigger event that triggers the vibration, wherein the trigger event includes an incoming voice call at the mobile device or an incoming electronic message at the mobile device.

In one example of the controller, the controller can include logic to execute on application that is configured to determine a composition of an object on which the mobile device resides based on the predefined pattern identified using the model.

In one example of the controller, the model is a neural network or a machine learning model.

In one example, there is provided a mobile device. The mobile device can include a vibration motor operable to generate a vibration, a sensor operable to capture a plurality of vibration signals that result from the vibration, and one or more processors. The one or more processors can provide the plurality of vibration signals to a model running on the mobile device. The model can include a plurality of predefined patterns that correspond to vibration signals produced by mobile devices residing on different surfaces. The one or more processors can identify, using the model, a predefined pattern in the plurality of predefined patterns that substantially corresponds to the plurality of vibration signals based on a confidence level that exceeds a threshold. The one or more processors can determine a type of surface on which the mobile device resides based on the predefined pattern identified using the model.

In one example of the mobile device, the one or more processors are further configured to: modify a functionality of the mobile device based on the type of surface on which the mobile device resides; or modify a user preference or setting based on the type of surface on which the mobile device resides.

In one example of the mobile device, the one or more processors are further configured to modify the functionality of the mobile device based on the type of surface to include one or more of: turning on or off a wireless module in the mobile device based on the type of surface, locking or unlocking the mobile device based on the type of surface, increasing or decreasing a volume of the mobile device based on the type of surface, turning on or off audio notifications for the mobile device based on the type of surface, or turning on or off vibratory notifications for the mobile device based on the type of surface.

In one example of the mobile device, wherein the vibration motor is configured to generate the vibration in response to a trigger event, wherein the trigger event includes an incoming voice call or an incoming electronic message.

In one example of the mobile device, the one or more processors are further configured to execute on application that is configured to determine a composition of an object on which the mobile device resides based on the predefined pattern identified using the model.

In one example of the mobile device, wherein the plurality of vibration signals corresponds to an orientation and a position of the mobile device.

In one example of the mobile device, the vibration motor is configured to generate the vibration in response to a trigger event, wherein the trigger event includes an incoming voice call or an incoming electronic message.

In one example of the mobile device, the one or more processors are further configured to execute on application that is configured to determine a composition of an object on which the mobile device resides based on the predefined pattern identified using the model.

In one example of the mobile device, the one or more processors are further configured to receive the model that includes the plurality of predefined patterns from a server.

In one example of the mobile device, the mobile device includes a gyroscope operable to capture orientation information for the mobile device. The one or more processors can receive the orientation information for the mobile device. The one or more processors can provide the orientation information to the model running on the mobile device. The one or more processors can identify, using the orientation information provided to the model, the predefined pattern in the plurality of predefined patterns that substantially corresponds to the plurality of vibration signals, wherein the predefined pattern further corresponds to a predefined type of orientation.

In one example of the mobile device, the plurality of predefined patterns correspond to different surfaces on which the mobile device is potentially residing and account for whether the mobile device includes a case, the different surfaces including one or more of: a clothing surface, a container surface, a soft surface, a rigid surface, a hand surface, a leather surface, a wood surface or a paper surface.

In one example of the mobile device, the model is a neural network or a machine learning model.

In one example of the mobile device, the one or more processors are configured to determine the type of surface on which the mobile device resides when the mobile device is idle or is currently not being used by a user.

In one example, there is provided a server operable to determine a type of surface on which a mobile device resides. The server can include memory and one or more processors. The one or more processors can receive a plurality of vibration signals from the mobile device, wherein the plurality of vibration signals correspond to a vibration generated at the mobile device. The one or more processors can provide the plurality of vibration signals to a model running on the server, wherein the model includes a plurality of predefined patterns that correspond to vibration signals produced by mobile devices residing on different surfaces. The one or more processors can identify, using the model, a predefined pattern in the plurality of predefined patterns that substantially corresponds to the plurality of vibration signals based on a confidence level that exceeds a threshold, wherein the predefined pattern corresponds to a predefined type of surface. The one or more processors can determine the type of surface on which the mobile device resides based on the predefined pattern identified using the model. The one or more processors can send an indication of the type of surface to the mobile device.

In one example of the server, the one or more processors are further configured to generate the model to include the predefined pattern that corresponds to the predefined type of surface.

In one example of the server, the one or more processors are further configured to: receive a plurality of training vibration signals when a training vibration is generated for the predefined type of surface; apply linear predictive coding (LPC) to the plurality of training vibration signals; generate the predefined pattern that corresponds to the predefined type of surface using the plurality of training vibration signals; and train or test the model using the predefined pattern that corresponds to the predefined type of surface.

In one example of the server, the one or more processors are further configured to: receive orientation information from the mobile device, wherein the orientation information indicates an orientation of the mobile device; provide the orientation information to the model running on the server; and identify, using the orientation information provided to the model, the predefined pattern in the plurality of predefined patterns that substantially corresponds to the plurality of vibration signals, wherein the predefined pattern further corresponds to a predefined type of orientation.

In one example of the server, the plurality of predefined patterns correspond to different surfaces on which the mobile device is potentially residing and account for whether the mobile device includes a case, the different surfaces including one or more of: a clothing surface, a container surface, a soft surface, a rigid surface, a hand surface, a leather surface, a wood surface or a paper surface.

In one example of the server, the plurality of vibration signals corresponds to an orientation and a position of the mobile device.

In one example of the server, the one or more processors are further configured to determine the type of surface on which the mobile device resides when the mobile device is not being used by a user.

In one example of the server, the one or more processors are further configured to determine the type of surface on which the mobile device resides when the mobile device is in an idle mode.

In one example of the server, the one or more processors are further configured receive the plurality of vibration signals in response to a trigger event that triggers the vibration at the mobile device, wherein the trigger event includes an incoming voice call at the mobile device or an incoming electronic message at the mobile device.

In one example of the server, the model is a neural network or a machine learning model.

In one example, there is provided a system operable to determine a type of surface on which a mobile device resides. The system can include the mobile device. The mobile device can include a vibration motor operable to generate a vibration, a sensor operable to capture a plurality of vibration signals based on the vibration, and a transceiver configured to transmit the plurality of vibration signals. The system can include a server that includes one or more processors. The one or more processors can receive the plurality of vibration signals from the mobile device. The one or more processors can provide the plurality of vibration signals to a model running on the server, wherein the model includes a plurality of predefined patterns that correspond to vibration signals produced by mobile devices residing on different surfaces. The one or more processors can identify, using the model, a predefined pattern in the plurality of predefined patterns that substantially corresponds to the plurality of vibration signals based on a confidence level that exceeds a threshold, wherein the predefined pattern corresponds to a predefined type of surface. The one or more processors can determine the type of surface on which the mobile device resides based on the predefined pattern identified using the model. The one or more processors can send an indication of the type of surface to the mobile device.

In one example of the system, the mobile device comprises one or more processors to: modify a functionality of the mobile device based on the type of surface on which the mobile device resides; or modify a user preference or setting based on the type of surface on which the mobile device resides.

In one example of the system, the mobile device further comprises one or more processors to modify the functionality of the mobile device based on the type of surface to include one or more of: turning on or off a wireless module in the mobile device based on the type of surface, locking or unlocking the mobile device based on the type of surface, increasing or decreasing a volume of the mobile device based on the type of surface, turning on or off audio notifications for the mobile device based on the type of surface, or turning on or off vibratory notifications for the mobile device based on the type of surface.

In one example of the system, the one or more processors in the server are further configured to generate the model to include the predefined pattern that corresponds to the predefined type of surface.

In one example of the system, the one or more processors in the server are further configured to: receive a plurality of training vibration signals when a training vibration is generated for the predefined type of surface; apply linear predictive coding (LPC) to the plurality of training vibration signals; generate the predefined pattern that corresponds to the predefined type of surface using the plurality of training vibration signals; and train or test the model using the predefined pattern that corresponds to the predefined type of surface.

In one example of the system, the one or more processors in the server are further configured to: receive orientation information from the mobile device, wherein the orientation information indicates an orientation of the mobile device; provide the orientation information to the model running on the server; and identify, using the orientation information provided to the model, the predefined pattern in the plurality of predefined patterns that substantially corresponds to the plurality of vibration signals, wherein the predefined pattern further corresponds to a predefined type of orientation.

In one example of the system, the plurality of predefined patterns correspond to different surfaces on which the mobile device is potentially residing and account for whether the mobile device includes a case, the different surfaces including one or more of: a clothing surface, a container surface, a soft surface, a rigid surface, a hand surface, a leather surface, a wood surface or a paper surface.

In one example of the system, the plurality of vibration signals corresponds to an orientation and a position of the mobile device.

In one example of the system, the one or more processors in the server are further configured to determine the type of surface on which the mobile device resides when the mobile device is not being used by a user.

In one example of the system, the one or more processors in the server are further configured to determine the type of surface on which the mobile device resides when the mobile device is in an idle mode.

In one example of the system, the one or more processors in the server are further configured to receive the plurality of vibration signals in response to a trigger event that triggers the vibration at the mobile device, wherein the trigger event includes an incoming voice call at the mobile device or an incoming electronic message at the mobile device.

In one example of the system, the mobile device further comprises one or more processors to execute on application that is configured to determine a composition of an object on which the mobile device resides based on the predefined pattern identified using the model.

In one example of the system, the model is a neural network or a machine learning model.

In one example, there is provided a method of making a mobile device. The method can include providing a vibration motor. The method can include providing a sensor. The method can include configuring one or more processors that are communicatively coupled to the vibration motor and the sensor to perform the following: receiving a plurality of vibration signals from the sensor, wherein the plurality of vibration signals correspond to a vibration generated using the vibration motor; providing the plurality of vibration signals to a model running on the mobile device, wherein the model includes a plurality of predefined patterns that correspond to vibration signals produced by mobile devices residing on different surfaces; identifying, using the model, a predefined pattern in the plurality of predefined patterns that substantially corresponds to the plurality of vibration signals based on a confidence level that exceeds a threshold, wherein the predefined pattern corresponds to a predefined type of surface; and determining the type of surface on which the mobile device resides based on the predefined pattern identified using the model.

In one example of the method of making the mobile device, the method includes configuring the one or more processors in the mobile device to perform the following: modifying a functionality of the mobile device based on the type of surface on which the mobile device resides; or modifying a user preference or setting based on the type of surface on which the mobile device resides.

In one example of the method of making the mobile device, the method includes configuring the one or more processors in the mobile device to perform the following: receiving the model that includes the plurality of predefined patterns from a server.

In one example of the method of making the mobile device, the method includes providing a gyroscope, and configuring the one or more processors in the mobile device to perform the following: receiving orientation information for the mobile device, wherein the orientation information is captured using the gyroscope; providing the orientation information to the model running on the mobile device; and identifying, using the orientation information provided to the model, the predefined pattern in the plurality of predefined patterns that substantially corresponds to the plurality of vibration signals, wherein the predefined pattern further corresponds to a predefined type of orientation.

In one example of the method of making the mobile device, the plurality of predefined patterns correspond to different surfaces on which the mobile device is potentially residing and account for whether the mobile device includes a case, the different surfaces including one or more of: a clothing surface, a container surface, a soft surface, a rigid surface, a hand surface, a leather surface, a wood surface or a paper surface.

In one example of the method of making the mobile device, the model is a neural network or a machine learning model.

In one example of the method of making the mobile device, the method includes configuring the one or more processors in the mobile device to perform the following: determining the type of surface on which the mobile device resides when the mobile device is idle or is currently being unused by a user.

In one example, there is provided at least one non-transitory machine readable storage medium having instructions embodied thereon. The instructions when executed by a server performs the following: receiving a plurality of vibration signals from a mobile device, wherein the plurality of vibration signals correspond to a vibration generated at the mobile device; providing the plurality of vibration signals to a model running on the server, wherein the model includes a plurality of predefined patterns that correspond to vibration signals produced by mobile devices residing on different surfaces; identifying, using the model, a predefined pattern in the plurality of predefined patterns that substantially corresponds to the plurality of vibration signals based on a confidence level that exceeds a threshold, wherein the predefined pattern corresponds to a predefined type of surface; determining the type of surface on which the mobile device resides based on the predefined pattern identified using the model; and sending an indication of the type of surface to the mobile device.

In one example of the at least one non-transitory machine readable storage medium, the non-transitory machine readable storage medium further comprises instructions when executed perform the following: generating the model to include the predefined pattern that corresponds to the predefined type of surface.

In one example of the at least one non-transitory machine readable storage medium, the non-transitory machine readable storage medium further comprises instructions when executed perform the following: receiving a plurality of training vibration signals when a training vibration is generated for the predefined type of surface; applying linear predictive coding (LPC) to the plurality of training vibration signals; generating the predefined pattern that corresponds to the predefined type of surface using the plurality of training vibration signals; and training or testing the model using the predefined pattern that corresponds to the predefined type of surface.

In one example of the at least one non-transitory machine readable storage medium, the non-transitory machine readable storage medium further comprises instructions when executed perform the following: receiving orientation information from the mobile device, wherein the orientation information indicates an orientation of the mobile device; providing the orientation information to the model running on the server; and identifying, using the orientation information provided to the model, the predefined pattern in the plurality of predefined patterns that substantially corresponds to the plurality of vibration signals, wherein the predefined pattern further corresponds to a predefined type of orientation.

In one example of the at least one non-transitory machine readable storage medium, the plurality of predefined patterns correspond to different surfaces on which the mobile device is potentially residing and account for whether the mobile device includes a case, the different surfaces including one or more of: a clothing surface, a container surface, a soft surface, a rigid surface, a hand surface, a leather surface, a wood surface or a paper surface.

In one example of the at least one non-transitory machine readable storage medium, the non-transitory machine readable storage medium further comprises instructions when executed perform the following: receiving the plurality of vibration signals in response to a trigger event that triggers the vibration at the mobile device, wherein the trigger event includes an incoming voice call at the mobile device or an incoming electronic message at the mobile device.

In one example of the at least one non-transitory machine readable storage medium, the non-transitory machine readable storage medium further comprises instructions when executed perform the following: executing on application that is configured to determine a composition of an object on which the mobile device resides based on the predefined pattern identified using the model.

In one example of the at least one non-transitory machine readable storage medium, the model is a neural network or a machine learning model.

In one example, there is provided a method for determining a type of surface on which a mobile device resides. The method can include receiving a plurality of vibration signals that correspond to a vibration. The method can include providing the plurality of vibration signals to a model, wherein the model includes a plurality of predefined patterns that correspond to vibration signals produced by mobile devices residing on different surfaces. The method can include identifying, using the model, a predefined pattern in the plurality of predefined patterns that substantially corresponds to the plurality of vibration signals, wherein the predefined pattern corresponds to a predefined type of surface. The method can include determining a type of surface on which the mobile device resides based on the predefined pattern identified using the model.

In one example of the method for determining the type of surface on which the mobile device resides, the method can include: modifying a functionality of the mobile device based on the type of surface on which the mobile device resides; or modifying a user preference or setting based on the type of surface on which the mobile device resides.

In one example of the method for determining the type of surface on which the mobile device resides, the method can include: receiving orientation information for the mobile device; providing the orientation information to the model; and identifying, using the orientation information provided to the model, the predefined pattern in the plurality of predefined patterns that substantially corresponds to the plurality of vibration signals, wherein the predefined pattern further corresponds to a predefined type of orientation.

In one example of the method for determining the type of surface on which the mobile device resides, the plurality of predefined patterns correspond to different surfaces on which the mobile device is potentially residing and account for whether the mobile device includes a case, the different surfaces including one or more of: a clothing surface, a container surface, a soft surface, a rigid surface, a hand surface, a leather surface, a wood surface or a paper surface.

In one example of the method for determining the type of surface on which the mobile device resides, the model is a neural network or a machine learning model.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A non-transitory computer readable medium comprising instructions which, when executed, cause a server to at least:
provide vibration information to a model, the vibration information corresponding to a first vibration measured at a first mobile device when the first mobile device is in a state of non-use by a user, the model based on a plurality of vibration patterns that correspond to second vibrations measured by second mobile devices in different environments;
identify, using the model, one of the vibration patterns that corresponds to the vibration information;
determine an environment of the first mobile device based on the one of the vibration patterns; and
instruct the first mobile device to modify a functionality of the first mobile device based on the environment.

2. The non-transitory computer readable medium of claim 1, wherein the instructions, when executed, cause the server to execute the model.

3. The non-transitory computer readable medium of claim 1, wherein the instructions, when executed, cause the server to identify the one of the vibration patterns based on a confidence level that exceeds a threshold.

4. The non-transitory computer readable medium of claim 1, wherein the instructions, when executed, cause the server to determine the environment by determining the environment is one or more of: a clothing surface, a container surface, a soft surface, a rigid surface, a hand surface, a leather surface, a wood surface, or a paper surface.

5. The non-transitory computer readable medium of claim 1, wherein the instructions, when executed, cause the server to:
 access training vibration information for the environment;
  apply linear predictive coding (LPC) to the training vibration information;
  generate the one of the vibration patterns that corresponds to the environment using the training vibration information; and
  at least one of train or test the model using the one of the vibration patterns that corresponds to the environment.

6. The non-transitory computer readable medium of claim 1, wherein the instructions, when executed, cause the server to determine a type of the environment of the first mobile device when the first mobile device is in an idle mode.

7. The non-transitory computer readable medium of claim 1, wherein the instructions, when executed, cause the server to run the model by running at least one of a neural network or a machine learning model.

8. A method comprising:
 providing, by executing an instruction with a processor, first vibration information to a model, the first vibration information corresponding to a first vibration generated at a first mobile device when the first mobile device is in a state of non-use by a user, the model based on a plurality of vibration patterns that correspond to second vibrations measured by second mobile devices in different environments;
 identifying, using the model, one of the vibration patterns that corresponds to the first vibration information;
 determining, by executing an instruction with the processor, an environment of the first mobile device based on the one of the vibration patterns; and
 instructing, by executing an instruction with the processor, the first mobile device to modify a functionality of the first mobile device based on the environment.

9. The method of claim 8, wherein the identifying of the one of the vibration patterns includes running the model on a server.

10. The method of claim 8, wherein the identifying of the one of the vibration patterns is based on a confidence level that exceeds a threshold.

11. The method of claim 8, further including determining a type of the environment of the first mobile device when the first mobile device is in an idle mode.

12. The method of claim 8, further including receiving the first vibration information after a trigger event that triggers the first vibration, the trigger event to include an incoming voice call at the first mobile device or an incoming electronic message at the first mobile device.

13. The method of claim 8, wherein the determining of the environment includes determining the environment includes one or more of: a clothing surface, a container surface, a soft surface, a rigid surface, a hand surface, a leather surface, a wood surface, or a paper surface.

14. The method of claim 8, further including running the model by running at least one of a neural network or a machine learning model.

15. A non-transitory computer readable medium comprising instructions which, when executed, cause a first mobile device to at least:
 provide first vibration information to a model, the first vibration information corresponding to a first vibration generated at the first mobile device when the first mobile device is in a state of non-use by a user, the model to include a plurality of vibration patterns that correspond to second vibrations measured by second mobile devices in different environments;
 identify, using the model, one of the vibration patterns that corresponds to the first vibration information;
 determine an environment of the first mobile device based on the one of the vibration patterns; and
 modify a functionality of the first mobile device based on the environment.

16. The non-transitory computer readable medium of claim 15, wherein the instructions, when executed, cause the first mobile device to identify the one of the vibration patterns based on a confidence level that exceeds a threshold.

17. The non-transitory computer readable medium of claim 15, wherein the instructions, when executed, cause the first mobile device to modify a user preference or setting based on the environment of the first mobile device.

18. The non-transitory computer readable medium of claim 15, wherein the instructions, when executed, cause the first mobile device to modify the functionality of the first mobile device based on the environment to include one or more of: turning on or off a wireless module in the first mobile device, locking or unlocking the first mobile device, increasing or decreasing a volume of the first mobile device, turning on or off audio notifications for the first mobile device, or turning on or off vibratory notifications for the first mobile device.

19. The non-transitory computer readable medium of claim 15, wherein the instructions, when executed, cause the first mobile device to generate the first vibration information after a trigger event that triggers the first vibration, the trigger event to include an incoming voice call at the first mobile device or an incoming electronic message at the first mobile device.

20. The non-transitory computer readable medium of claim 15, wherein the instructions, when executed, cause the first mobile device to run the model by running at least one of a neural network or a machine learning model.

* * * * *